United States Patent
Saito et al.

(10) Patent No.: US 8,817,224 B2
(45) Date of Patent: Aug. 26, 2014

(54) INPUT DEVICE AND METHOD FOR MANUFACTURING THE SAME

(71) Applicant: Alps Electric Co., Ltd., Tokyo (JP)

(72) Inventors: Shoji Saito, Niigata-ken (JP); Kiyoshi Kobayashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 14/106,108

(22) Filed: Dec. 13, 2013

(65) Prior Publication Data

US 2014/0102633 A1    Apr. 17, 2014

Related U.S. Application Data

(62) Division of application No. 13/401,749, filed on Feb. 21, 2012.

(30) Foreign Application Priority Data

Mar. 29, 2011   (JP) .................................. 2011-072493

(51) Int. Cl.
*G02F 1/13*   (2006.01)
*G06F 3/044*   (2006.01)
*B32B 17/06*   (2006.01)
*G06F 3/041*   (2006.01)

(52) U.S. Cl.
CPC .............. *B32B 17/064* (2013.01); *G06F 3/044* (2013.01); *G06F 3/041* (2013.01)
USPC .............................. 349/187; 349/12; 345/173

(58) Field of Classification Search
None
See application file for complete search history.

(56) References Cited

U.S. PATENT DOCUMENTS

| 2005/0083307 A1 | 4/2005 | Aufderheide et al. |
| 2011/0007005 A1 | 1/2011 | Lee et al. |
| 2011/0109583 A1 | 5/2011 | Lee |
| 2012/0026107 A1 | 2/2012 | Kim et al. |
| 2012/0247939 A1 | 10/2012 | Kim et al. |

FOREIGN PATENT DOCUMENTS

| JP | 2004-527752 | 9/2004 |
| JP | 2005-244143 | 9/2005 |
| JP | 2006-190189 | 7/2006 |
| JP | 2007-508639 | 4/2007 |
| JP | 2008-151807 | 7/2008 |

(Continued)

OTHER PUBLICATIONS

Notification of Reason for Refusal dated Apr. 24, 2012 from Japanese Application No. 2011-072493.

(Continued)

*Primary Examiner* — Richard Kim
(74) *Attorney, Agent, or Firm* — Beyer Law Group LLP

(57) ABSTRACT

An input device is manufactured from a roll of a single-layer flexible transparent base sheet having a first surface and a second surface by forming a transparent electrode pattern and a wiring layer on the first surface. The transparent electrode pattern is disposed in a transparent input region, and the wiring layer extends from an end of the transparent electrode pattern into a decorative region surrounding the transparent input region. A decorative layer pattern is formed on the second surface in the decorative region, while conveying the transparent base sheet through a roll-to-roll processing. The transparent base sheet having the transparent electrode pattern and the decorative layer pattern is divided into individual units. A transparent panel having an operation surface is bonded to the second surface of each of the individual units with an optically clear adhesive layer interposed therebetween.

11 Claims, 4 Drawing Sheets

(56) References Cited

FOREIGN PATENT DOCUMENTS

| | | |
|---|---|---|
| JP | 2009-193587 | 8/2009 |
| JP | 2009-301767 | 12/2009 |
| JP | 2011-18324 | 1/2011 |
| JP | 2011-44126 | 3/2011 |
| JP | 2011-49379 | 3/2011 |
| JP | 2011-528147 | 11/2011 |

OTHER PUBLICATIONS

Decision of Refusal dated Aug. 7, 2012 from Japanese Application No. 2011-072493.

Notification of Reasons for Refusal dated Oct. 4, 2013 from TW Application No. 101104775.

Office Action dated Nov. 20, 2013 from U.S. Appl. No. 13/401,749.

INPUT DEVICE AND METHOD FOR MANUFACTURING THE SAME

CLAIM OF PRIORITY

This application is a Divisional of U.S. patent application Ser. No. 13/401,749 filed on Feb. 21, 2012 which claims benefit of Japanese Patent Application No. 2011-072493 filed on Mar. 29, 2011, the entire contents of each of which are hereby incorporated by reference.

BACKGROUND OF THE INVENTION

1. Field of the Invention

The present invention relates to an input device (touch panel) used in conjunction with a liquid crystal display (LCD) and the like, and to a method for manufacturing the input device.

2. Description of the Related Art

For example, as described in Japanese Unexamined Patent Application Publication No. 2009-301767, a touch panel includes a transparent surface panel (transparent substrate 23), a decorative layer (light-shielding layer 24) formed in a decorative region under the surface panel, a transparent planarizing layer (overcoat layer 25) formed over the entire undersurface of the surface panel and decorative layer, and a transparent electrode (transparent conductive layer 26) formed on the undersurface of the planarizing layer.

In the touch panel described in Japanese Unexamined Patent Application Publication No. 2009-301767, the planarizing layer is formed by spin-coating a transparent resin, such as a photosensitive acrylic resin.

However, when the planarizing layer is a resin layer formed by spin coating, the degree of planarization of the planarizing layer is reduced particularly due to, for example, a level difference between the surface panel and the decorative layer. As a result, since the transparent electrode cannot be formed on a planarized surface, the sensor sensitivity may be reduced.

While Japanese Unexamined Patent Application Publication No. 2009-301767 does not specifically describe a method for manufacturing an input device, the method involves a manufacturing process in which a decorative layer, a planarizing layer, and a transparent electrode are stacked on each of surface panels obtained by dividing a glass panel. This may lead to lower productivity and cause variations in quality among touch panels.

Moreover, if a roll-to-roll method is adopted in the manufacturing process, it is not possible to use glass for the surface panel in the configuration described in Japanese Unexamined Patent Application Publication No. 2009-301767. Even if glass is used, there are restrictions on the properties of the glass. For better contact with the decorative layer or for later division into separate pieces, such glass as tempered glass cannot be used.

A touch panel described in Japanese Unexamined Patent Application Publication No. 2009-193587 is also formed by staking a decorative layer (masking layer 12) in a decorative region under a surface panel (single substrate 11), a planarizing layer (smooth layer 15), and a transparent electrode (sense circuit 13), and thus suffers from problems similar to those of the touch panel described in Japanese Unexamined Patent Application Publication No. 2009-301767.

The present invention has been made to solve the problems of the related art described above. The present invention provides a low-profile input device that has high sensor sensitivity and can be manufactured by roll-to-roll processing, and also provides a method for manufacturing the input device.

SUMMARY OF THE INVENTION

According to an aspect of the present invention, an input device includes a flexible transparent base; a transparent electrode formed on a first surface of the transparent base; a decorative layer formed on a second surface of the transparent base, the second surface being opposite the first surface; and a transparent panel bonded to the second surface of the transparent base, with an optical clear adhesive layer interposed therebetween.

According to another aspect of the present invention, a method for manufacturing an input device includes forming a transparent electrode on a first surface of a flexible transparent base and forming a decorative layer on a second surface of the transparent base while conveying the transparent base through roll-to-roll processing, the second surface being opposite the first surface; dividing the transparent base having the transparent electrode and the decorative layer formed thereon into pieces; and bonding a transparent panel to the second surface of each of the pieces, with an optical clear adhesive layer interposed therebetween.

According to the aspects of the present invention, the decorative layer and the transparent electrode can be formed on planarizing surfaces (i.e., the first surface and the second surface) of the transparent base by roll-to-roll processing. Thus, the input device having high sensor sensitivity can be manufactured with high productivity. Additionally, with a configuration where the transparent panel is bonded to the transparent base with the optical clear adhesive layer interposed therebetween, it is possible to eliminate restrictions on the material of the transparent panel. It is thus possible to realize the input device that can be manufactured with high productivity and has a high degree of freedom for the material of the transparent panel.

In the input device described above, the first surface may be provided with a transparent protective layer configured to cover a surface of the transparent electrode. This is desirable in that the transparent electrode can be protected.

In the input device described above, the transparent electrode may have a single-layer structure. This can further reduce the thickness of the input device.

In the input device described above, a glass panel, such as a tempered glass panel, may be used as the transparent panel without specific restrictions on the material.

In the input device described above, a polyethylene terephthalate (pet) film may be used as the transparent base. This makes it possible to manufacture the input device at low cost and to properly apply a roll-to-roll method to the manufacture.

DESCRIPTION OF THE PREFERRED EMBODIMENTS

Figure 1:
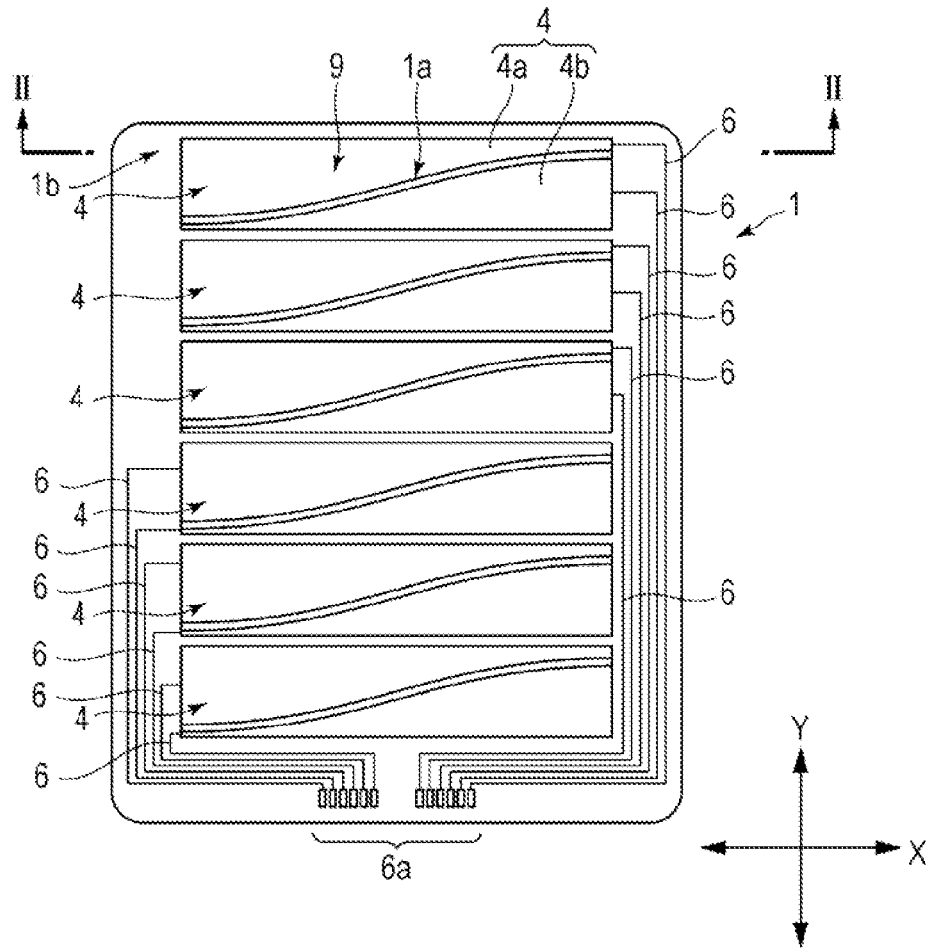
FIG. 1 is a plan view of a capacitive touch panel (input device) according to an embodiment.
Figure 2:
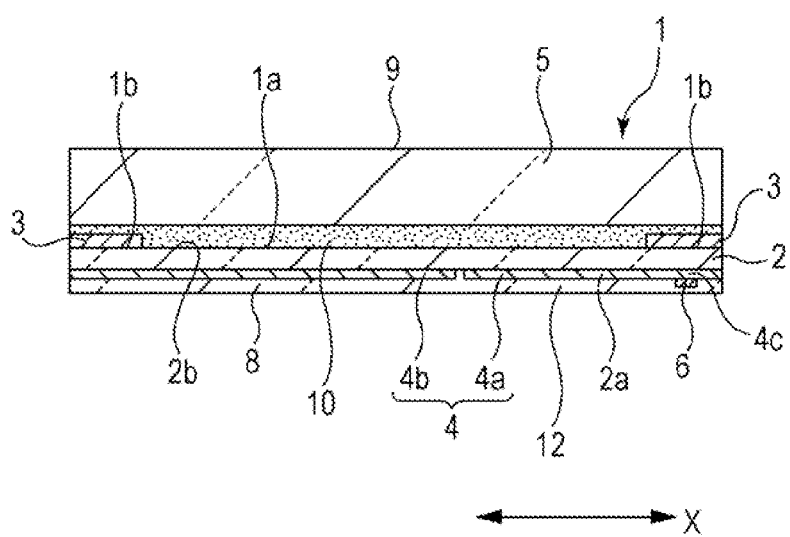
FIG. 2 is a vertical sectional view of the touch panel taken along line II-II of FIG. 1 as viewed in the direction of arrows.

FIG. 1 is a plan view of a capacitive touch panel (input device) according to an embodiment. FIG. 2 is a vertical sectional view of the touch panel taken along line II-II of FIG. 1 as viewed in the direction of arrows.

A touch panel 1 includes a flexible transparent base 2, a decorative layer 3, transparent electrodes 4, and a glass panel (transparent panel) 5. The terms "transparent" and "light-transmissive" refer to a state where visible light transmittance is 60% or more (preferably 80% or more). It is more preferable that the haze value is 6 or less.

For example, a pet film may be preferably used as the flexible transparent base 2. The transparent electrodes 4 are formed on a first surface (lower surface) 2a of the transparent base 2. As illustrated in FIG. 1, the transparent electrodes 4 are formed in a transparent input region 1a of the touch panel 1. The transparent input region 1a extends over a wide range in the center of the touch panel 1. Although the transparent input region 1a is rectangular in the present embodiment, the shape of the transparent input region 1a is not limited to this.

As illustrated in FIG. 1, the transparent electrodes 4 are spaced apart in the Y direction. The transparent electrodes 4 each include a pair of a first electrode element 4a and a second electrode element 4b separate from each other. Although the present embodiment does not restrict the shapes of the first electrode element 4a and the second electrode element 4b, the first electrode element 4a and the second electrode element 4b are formed such that their widths in the Y direction change along the X direction.

The transparent electrodes 4 are formed by sputtering or depositing a transparent conductive material, such as indium tin oxide (ITO). To realize the shape of FIG. 1, the transparent electrodes 4 are formed by patterning using photolithography.

As illustrated in FIG. 1, a wiring layer 6 extends from an end of each first electrode element 4a or from an end of each second electrode element 4b in the X direction.

As illustrated in FIG. 1, the wiring layers 6 extend within a decorative region 1b that surrounds the transparent input region 1a. As will be described below, since the decorative layer 3 (see FIG. 2) is formed in the decorative region 1b, the wiring layers 6 cannot be actually seen from an operation surface 9 of the touch panel 1. However, for descriptive purposes, FIG. 1 illustrates the wiring layers 6 as seen through the decorative layer 3.

As illustrated in FIG. 2, transparent conductive layers 4c made of the same transparent conductive material as the transparent electrodes 4 are disposed in areas where there are the wiring layers 6. The wiring layers 6 are formed on the surface (i.e., lower surface in FIG. 2) of the transparent conductive layers 4c. The transparent conductive layers 4c are portions that are left, after etching for patterning the transparent electrodes 4, in areas overlaid with the wiring layers 6. Alternatively, the transparent conductive layers 4c may not be provided. Instead, the wiring layers 6 may be formed on the first surface 2a of the transparent base 2 where the transparent electrodes 4 are disposed.

The wiring layers 6 are made of a metal material which contains, for example, any of Ag, Cu, Cu alloy, Al, Mo, CuNi alloy, and Ni. The wiring layers 6 are formed, for example, by printing Ag paste.

As illustrated in FIG. 1, the wiring layers 6 are routed within the decorative region 1b and collected in an area connected to a flexible printed circuit board (not shown). Ends of the wiring layers 6 form an externally-connected portion 6a which is electrically connected to the flexible printed circuit board.

As illustrated in FIG. 2, a transparent protective layer 8 may be disposed on the lower surface of the transparent electrodes 4 and wiring layers 6. The transparent protective layer 8 can protect the transparent electrodes 4 and the wiring layers 6. The transparent protective layer 8 is provided in an area other than the area of the externally-connected portion 6a, so that the externally-connected portion 6a can be connected to the flexible printed circuit board.

The transparent protective layer 8 is, for example, a hard coat film obtained by forming a hard coat layer of urethane acrylate resin on the surface of a thin PET base. The transparent protective layer 8 is bonded to the lower surface of the transparent electrodes 4 and wiring layers 6, with an optical clear adhesive layer (OCA) (not shown) interposed therebetween.

As illustrated in FIG. 2, the decorative layer 3, which is colored, is formed on a second surface (upper surface) 2b of the transparent base 2. The decorative layer 3 is disposed in the decorative region 1b which surrounds the transparent input region 1a. The decorative layer 3 is formed, for example, by screen printing. The decorative region 1b where there is the decorative layer 3 is non-light-transmissive, whereas the transparent input region 1a is light-transmissive. Thus, the decorative layer 3 prevents the wiring layers 6 from being seen from the operation surface 9.

As illustrated in FIG. 2, the glass panel 5 may be bonded to the second surface 2b of the transparent base 2, with an optical clear adhesive layer 10 interposed therebetween. The optical clear adhesive layer 10 is, for example, an acrylic adhesive or a double-faced adhesive tape.

The glass panel 5 illustrated in FIG. 2 serves as a surface layer of the touch panel 1. The surface of the glass panel 5 is the operation surface 9 of the touch panel 1. For example, if the operator touches the operation surface 9 with a finger or puts a finger close to the operation surface 9, a capacitance between the finger and either of the first and second electrode elements 4a and 4b close to the finger changes. The operation position of the finger can be calculated on the basis of the change in capacitance.

The glass panel 5 does not have to be a flat panel and may be, for example, a curved panel. The glass panel 5 does not have to be a glass panel, and may be a transparent panel made of a non-glass material. The transparent panel may constitute part of a housing.

FIG. 3 to FIG. 6 illustrate a series of steps of a method for manufacturing the touch panel 1 according to the present embodiment.

Figure 3:
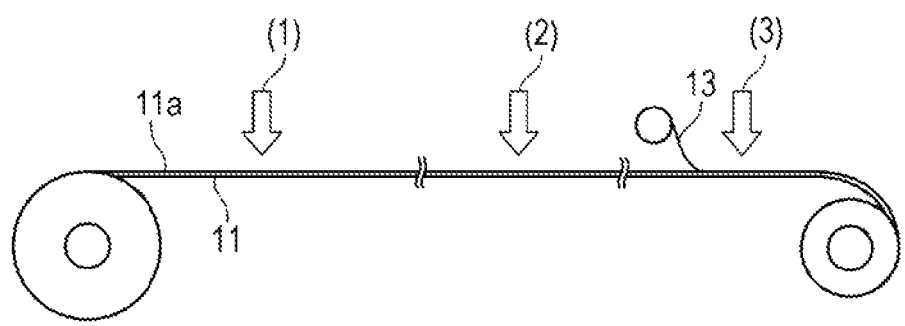
FIG. 3 is a schematic view illustrating a step of a method for manufacturing the touch panel according to the embodiment.

As illustrated in the schematic view of FIG. 3, a rolled flexible transparent base 11, such as a PET film, is conveyed to each step by roll-to-roll processing.

First, in a step (1) illustrated in FIG. 3, a transparent conductive film is formed on a first surface 11a of the transparent base 11 by sputtering or depositing a transparent conductive material, such as ITO. The transparent base 11 having the transparent conductive film formed over the entire first surface 11a is conveyed to the next step (2), where the transparent electrodes 4 having the shape of FIG. 1 are formed by patterning using photolithography. The wiring layers 6 are screen-printed in the period between the steps (1) and (2) or after the step (2). If the wiring layers 6 are formed in the period between the steps (1) and (2), the wiring layers 6 are formed on the surface of the transparent conductive film. In this case, the transparent conductive layers 4c (see FIG. 2) overlaid with the wiring layers 6 can be left after the photolithography in the step (2).

Then, the transparent base 11 having the transparent electrodes 4 and the wiring layers 6 formed thereon is conveyed to the next step (3). In the step (3), a transparent protective layer (hard coat film) 13 obtained by forming a hard coat layer of urethane acrylate resin or the like on the surface of a thin PET base is bonded to the surface of the transparent electrodes 4 and wiring layers 6.

In FIG. 3, the steps (1) to (3) are performed in a single continuous roll-to-roll process. Alternatively, the transparent base 11 may be rolled up in each of the steps (1) to (3), which are performed in different roll-to-roll processes.

Figure 4:
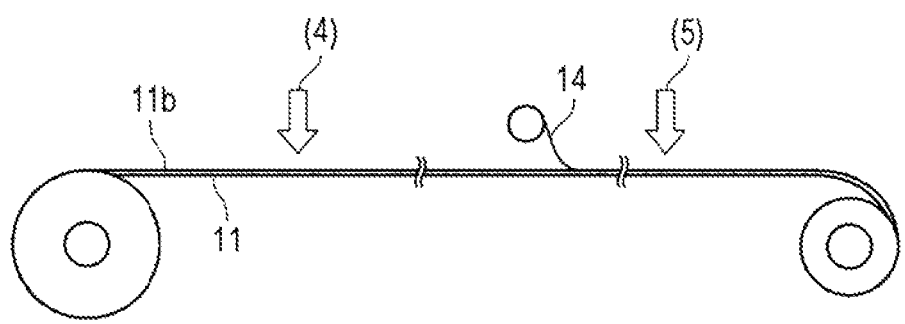
FIG. 4 is a schematic view illustrating a step performed after the step of FIG. 3.

After the transparent base 11 obtained by performing the steps (1) to (3) of FIG. 3 is rolled up, the transparent base 11 is conveyed to each step of another roll-to-roll process illustrated in FIG. 4.

The roll-to-roll process of FIG. 4 involves steps (4) and (5) performed on a second surface 11b of the transparent base 11.

First, in the step (4), the decorative layer 3 is screen-printed on the second surface 11b of the transparent base 11. As described with reference to FIG. 1 and FIG. 2, the decorative layer 3 is formed in the decorative region 1b by printing.

Then, the transparent base 11 having the decorative layer 3 formed thereon is conveyed to the next step (5). In the step (5), an optical clear adhesive layer, such as a double-faced adhesive tape 14, is attached to the surface of the decorative layer 3 and to the entire area of a transparent input region of the transparent base 11. Since the double-faced adhesive tape 14 is provided with a peel-off sheet on the surface (outer surface) thereof, the transparent base 11 having the double-faced adhesive tape 14 attached thereto can be rolled up.

All the steps illustrated in FIG. 3 and FIG. 4 may be performed in a single roll-to-roll process. When the steps illustrated in FIG. 3 and FIG. 4 are performed in a plurality of roll-to-roll processes, it is possible to freely determine the steps with which each of the roll-to-roll processes starts and ends. The steps illustrated in FIG. 3 may be performed after the steps illustrated in FIG. 4.

Figure 5:
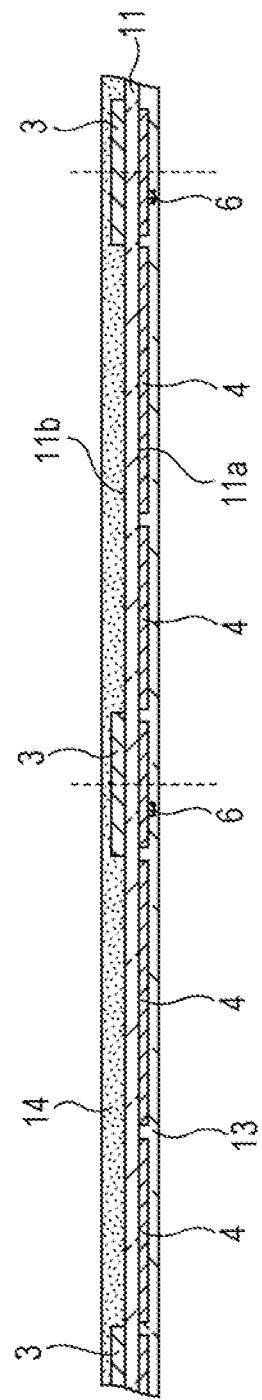
FIG. 5 is a partially enlarged vertical sectional view illustrating a step performed after the step of FIG. 4.

As illustrated in FIG. 5, the first surface 11a of the long band-like transparent base 11 is provided with the transparent electrodes 4 and the wiring layers 6 corresponding to a plurality of touch panels 1 and the transparent protective layer 13 extending over the entire first surface 11a, while the second surface 11b of the transparent base 11 is provided with decorative layers 3 corresponding to the plurality of touch panels 1 and the double-faced adhesive tape (optical clear adhesive layer) 14 extending over the entire second surface 11b.

Figure 6:
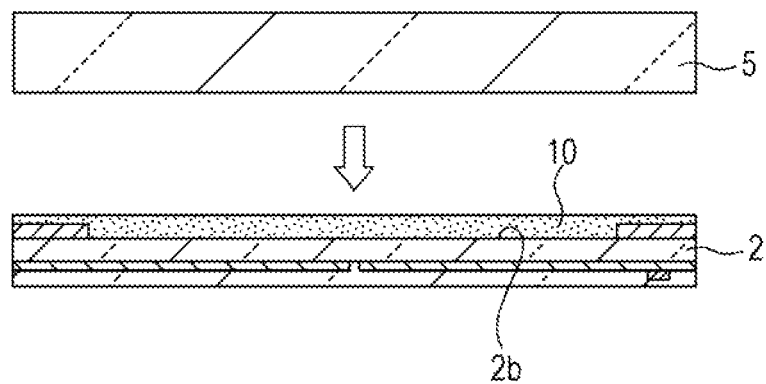
FIG. 6 is a vertical sectional view illustrating a step performed after the step of FIG. 5.

In the step illustrated in the partially enlarged vertical sectional view of FIG. 5, the long band-like transparent base 11 is cut along dotted lines into a plurality of transparent bases 2 (see FIG. 6).

Then, as illustrated in FIG. 6, the glass panel 5 is bonded to the second surface 2b of each transparent base 2, with the optical clear adhesive layer 10 interposed therebetween.

In the present embodiment, as described above, the decorative layer 3 and the transparent electrodes 4 can be formed on planarizing surfaces (i.e., the first surface 2a and the second surface 2b) of the transparent base 2 by roll-to-roll processing. Thus, the touch panel 1 having high sensor sensitivity can be manufactured with high productivity. Additionally, with a configuration where a transparent panel serving as a surface layer is bonded to the transparent base 2 with the optical clear adhesive layer 10 interposed therebetween, it is possible to eliminate restrictions on the material of the transparent panel. It is thus possible to realize the touch panel 1 that can be manufactured with high productivity and has a high degree of freedom for the material of the transparent panel.

In the present embodiment, the glass panel 5, such as a tempered glass panel, can be freely selected as the transparent panel. Moreover, even if the transparent panel has a curved shape, the transparent base 11 having the decorative layers 3 and the transparent electrodes 4 formed thereon by roll-to-roll processing can be readily bonded to the transparent panel.

In the present embodiment, a PET film, which is low-cost and suitable for roll-to-roll processing, can be used as the transparent base 2.

Figure 7:
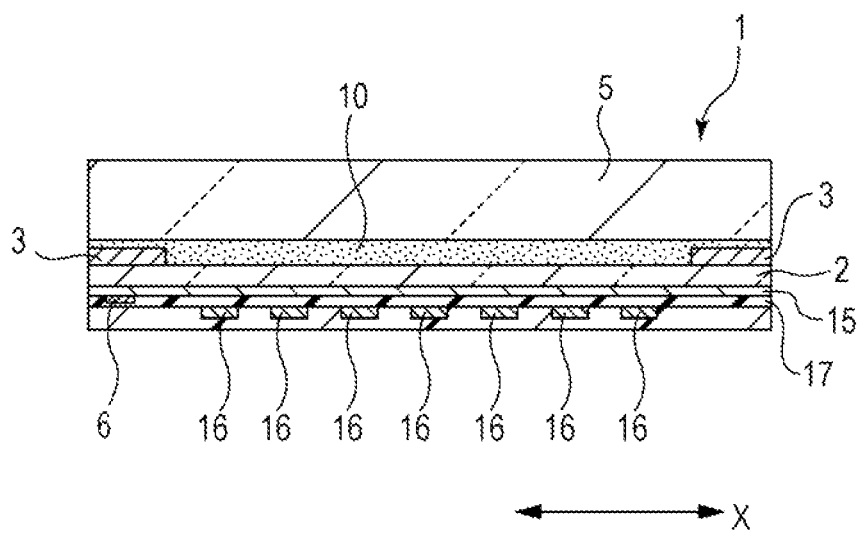
FIG. 7 is a vertical sectional view of a touch panel according to an embodiment different from that illustrated in FIG. 2.

In another embodiment, as illustrated in FIG. 7, two layers of transparent electrodes 15 and 16 may be stacked, with a transparent insulating layer 17 interposed therebetween. In this case, for example, a plurality of transparent electrodes 15 extend in the X direction and are spaced apart in the Y direction (see FIG. 1), whereas a plurality of transparent electrodes 16 extend in the Y direction and are spaced apart in the X direction.

However, as illustrated in FIG. 1 and FIG. 2, the transparent electrodes 4 may be configured to have a single-layer structure. This is desirable in that the thickness of the touch panel 1 can be further reduced.

The touch panel 1 according to either of the embodiments is of capacitive type, and a liquid crystal display (not shown) is disposed on the underside of the touch panel 1. The contents displayed on the liquid crystal display can be seen in the transparent input region 1a of the touch panel 1. The operator can perform an input operation while seeing the contents displayed in the transparent input region 1a.

The touch panel (input device) according to either of the embodiments can be used, for example, in mobile phones, digital cameras, personal digital assistants (PDAs), game machines, and car navigation systems.

What is claimed is:

1. A method for manufacturing an input device, the method comprising:
  providing a roll of a single-layer flexible transparent base sheet having a first surface and a second surface opposite to the first surface;
  forming a transparent electrode pattern and a wiring layer on the first surface of the flexible transparent base sheet, the transparent electrode pattern being disposed in a transparent input region and the wiring layer extending from an end of the transparent electrode pattern into a decorative region surrounding the transparent input region, and forming a decorative layer pattern on the second surface of the transparent base sheet in the decorative region, while conveying the transparent base sheet through a roll-to-roll processing;
  dividing the transparent base sheet having the transparent electrode pattern and the decorative layer pattern formed thereon into individual units each for the input device; and
  bonding a transparent panel to the second surface of each of the individual units, with an optically clear adhesive layer interposed therebetween, a surface of the transparent panel opposite to a surface facing the optically clear adhesive layer serving as an operation surface.

2. The method according to claim 1, further comprising:
  forming a transparent protective layer on the first surface of the transparent base sheet after forming the transparent electrode pattern during the roll-to-roll processing, the transparent protective layer covering a surface of the transparent electrode pattern.

3. The method according to claim 2, wherein the forming the transparent protective layer includes:

bonding a hard coat film having a hard coat layer to a surface of the transparent electrode pattern and the wiring layer.

4. The method according to claim 1, wherein a glass panel is used as the transparent panel.

5. The method according to claim 1, wherein a polyethylene terephthalate film is used as the transparent base sheet.

6. The method according to claim 1, wherein the roll-to-roll processing includes a first roll-to-roll processing for forming elements on the first surface and a second roll-to-roll processing for forming elements on the second surface.

7. The method according to claim 1, wherein the decorative layer pattern defines an input region for each individual unit by surrounding the input region.

8. The method according to claim 7, wherein in the dividing, the transparent base sheet is cut in a middle of the decorative layer formed between adjacent input regions.

9. The method according to claim 7, further comprising:
forming a wiring layer on the first surface of the transparent base sheet within a region where the decorative layer is formed, during the roll-to-roll processing.

10. The method according to claim 1, further comprising:
forming a transparent electrode layer made of a same transparent material as the transparent electrode in the decorative region, the transparent electrode layer continuously extending from an end of the transparent electrode,
wherein the wiring layer is formed on a surface of the transparent electrode layer.

11. The method according to claim 1, wherein the input device is formed as a capacitance-type touch panel.

* * * * *